United States Patent
Gong et al.

(10) Patent No.: US 11,719,841 B1
(45) Date of Patent: Aug. 8, 2023

(54) TIMING ALIGNMENT METHOD FOR DATA ACQUIRED BY MONITORING UNITS OF BOREHOLE-SURFACE MICRO-SEISMIC MONITORING SYSTEM

(71) Applicants: CHINA UNIVERSITY OF MINING AND TECHNOLOGY, Xuzhou (CN); Xuzhou Hongyi Technology Development Co., Ltd., Xuzhou (CN)

(72) Inventors: Siyuan Gong, Xuzhou (CN); Qing Ge, Xuzhou (CN); Linming Dou, Xuzhou (CN)

(73) Assignees: CHINA UNIVERSITY OF MINING AND TECHNOLOGY, Xuzhou (CN); Xuzhou Hongyi Technology Development Co., Ltd., Xuzhou (CN)

( * ) Notice: Subject to any disclaimer, the term of this patent is extended or adjusted under 35 U.S.C. 154(b) by 0 days.

(21) Appl. No.: 18/122,140

(22) Filed: Mar. 16, 2023

(30) Foreign Application Priority Data

May 27, 2022 (CN) .......................... 202210586305.X (51) Int. Cl.
*G01V 1/28* (2006.01)
*G04R 20/02* (2013.01)

(52) U.S. Cl.
CPC ............. *G01V 1/288* (2013.01); *G04R 20/02* (2013.01)

(58) Field of Classification Search
CPC .................................. G01V 1/288; G04R 20/02
See application file for complete search history.

(56) References Cited

U.S. PATENT DOCUMENTS

| | | | | |
|---|---|---|---|---|
| 7,253,671 | B2 * | 8/2007 | Hall | .................. H03K 23/52 |
| | | | | 327/378 |
| 8,181,057 | B2 * | 5/2012 | Nichols | ................... G01V 1/40 |
| | | | | 713/401 |

(Continued)

FOREIGN PATENT DOCUMENTS

| CN | 101963673 A | 2/2011 |
|---|---|---|
| CN | 204631259 U | 9/2015 |

(Continued)

OTHER PUBLICATIONS

Krzysztof Oset, et al., Application of Audio over Ethernet Transmission Protocol for Synchronization of Seismic Phenomena Measurement Data in order to Increase Phenomena Localization Accuracy and Enable Programmable Noise Cancellation, Communications in Computerand Information Science, 2019, pp. 319-340, vol. 1018, Springer.

(Continued)

*Primary Examiner* — Elias Desta
(74) *Attorney, Agent, or Firm* — Bayramoglu Law Offices LLC (57) ABSTRACT

A timing alignment method for data acquired by monitoring units of a borehole-surface micro-seismic monitoring system includes acquiring two rock-burst waveform data segments with GPS timestamps; calculating a time difference and a number of sampling points between each pair of adjacent GPS timestamps; adding, on an equal-interval basis, a sampling time to a sampling point missing a timestamp between each pair of adjacent GPS timestamps; calculating average sampling frequencies of the two rock-burst waveform data segments, adding, on an equal-interval basis, a sampling time to a sampling point missing a timestamp except first and last GPS timestamps in each of the two data segments; obtaining sampling times of all sampling points, resampling the sampling times according to (Continued)

a uniform sampling frequency; calculating a rock-burst waveform data segment at a new sampling time with a linear interpolation formula, and aligning the sampling times of the two rock-burst waveform data segments.

6 Claims, 6 Drawing Sheets

(56) References Cited

U.S. PATENT DOCUMENTS

| | | | |
|---|---|---|---|
| 11,502,913 B1* | 11/2022 | Kamen | H04L 43/50 |
| 2010/0074055 A1 | 3/2010 | Nemeth et al. | |
| 2010/0198561 A1 | 8/2010 | Laine | |
| 2012/0140594 A1 | 6/2012 | Cook et al. | |
| 2015/0159482 A1* | 6/2015 | Xu | H04B 1/69 |
| | | | 340/855.4 |

FOREIGN PATENT DOCUMENTS

| | | |
|---|---|---|
| CN | 105116441 A | 12/2015 |
| CN | 205644073 U | 10/2016 |
| CN | 110297271 A | 10/2019 |
| CN | 112051608 A | 12/2020 |
| CN | 113050158 A | 6/2021 |
| CN | 113217109 A | 8/2021 |
| WO | 2020177491 A1 | 9/2020 |

OTHER PUBLICATIONS

Zhu Ya-Dong-Yang, et al., Micro-seismic monitoring and instrument for hydraulic fracturing in the low-permeability bilfield, Chinese Journal of Geophysics, 2017, pp. 4282-4293, vol. 60, No. 11.

Zhang Qing-Qing, Research on Time Synchronization of Underground and Surface Combined Microseismic Monitoring System, Coal Technology, 2017, pp. 126-128, vol. 36, No. 03.

* cited by examiner

TIMING ALIGNMENT METHOD FOR DATA ACQUIRED BY MONITORING UNITS OF BOREHOLE-SURFACE MICRO-SEISMIC MONITORING SYSTEM

CROSS-REFERENCE TO THE RELATED APPLICATION

This application is based upon and claims priority to Chinese Patent Application No. 202210586305.X, filed on May 27, 2022, the entire content of which is incorporated herein by reference.

TECHNICAL FIELD

The present disclosure relates to a timing alignment method for data acquired by monitoring units of a borehole-surface micro-seismic monitoring system, and belongs to the technical field of coal mine safety.

BACKGROUND

Coal is a primary source of energy in China, and its safe mining is crucial to China's energy security. In recent years, many coal mines have entered deep mining, and the safety problems caused by rock burst have become increasingly prominent. At present, as an important technology for risk analysis and early warning of rock burst, micro-seismic monitoring technology has been widely used in China's coal mines, and has achieved significant monitoring and early warning effects. However, limited by the installation conditions of sensors in the underground near-horizontal roadway, simply laying sensors underground cannot achieve the purpose of significantly improving the precision of micro-seismic monitoring.

In order to achieve accurate detection of rock burst, a certain number of sensors are installed on the ground to form a borehole-surface observation mode, which can surround the monitoring zone in three-dimensional space. To facilitate the movement of ground monitoring points and ensure the quality of underground monitoring data, the surface monitoring unit adopts wireless communication, while the underground monitoring unit adopts wired communication. These two monitoring methods independently carry out discontinuous timing of sampling data by the global positioning system (GPS). Due to the unstable sampling frequency of the two monitoring units, the timed data of the two monitoring units acquired in the monitoring center cannot be aligned, which greatly limits the improvement of micro-seismic monitoring accuracy.

SUMMARY

In order to solve the problems existing in the prior art, the present disclosure provides a timing alignment method for data acquired by monitoring units of a borehole-surface micro-seismic monitoring system. The present disclosure can accurately align seismic wave data segments acquired by a surface wireless monitoring unit and an underground wired monitoring unit of the borehole-surface micro-seismic monitoring system, so as to ensure the accuracy of the subsequent rock-burst location and energy solution, and improve the micro-seismic monitoring accuracy.

In order to achieve the above objective, the present disclosure provides the following technical solution. The timing alignment method for data acquired by monitoring units of a borehole-surface micro-seismic monitoring system includes the following steps:

(1) extracting a first rock-burst waveform data segment and a second rock-burst waveform data segment that are respectively acquired by a surface wireless monitoring unit and an underground wired monitoring unit of the borehole-surface micro-seismic monitoring system and each provided with multiple global positioning system (GPS) timestamps, where the first rock-burst waveform data segment and the second rock-burst waveform data segment have different lengths;

(2) calculating a time difference and a number of sampling points between each pair of adjacent GPS timestamps in each of the first rock-burst waveform data segment and the second rock-burst waveform data segment; and adding, on an equal-interval basis, a sampling time to a sampling point missing a timestamp between each pair of adjacent GPS timestamps;

(3) calculating an average sampling frequency of each of the first rock-burst waveform data segment and the second rock-burst waveform data segment; and adding, on an equal-interval basis, a sampling time to a sampling point missing a timestamp except first and last GPS timestamps in each of the first rock-burst waveform data segment and the second rock-burst waveform data segment;

(4) resampling sampling times of all sampling points obtained in steps (2) and (3), according to a uniform sampling frequency; and (5) calculating, based on the sampling times of all the sampling points obtained in steps (2) and (3) and rock-burst waveform data segments at the sampling times, a rock-burst waveform data segment at a new sampling time according to step (4) with a linear interpolation formula; and aligning the sampling times of the first rock-burst waveform data segment and the second rock-burst waveform data segment.

Further, in step (1), the surface wireless monitoring unit and the underground wired monitoring unit carry out independent high-precision GPS timing separately, and sample at sampling frequencies $f_s$ and $f_u$, respectively; the first rock-burst waveform data segment and the second rock-burst waveform data segment are denoted as $y_i^s$ and $y_j^u$, respectively; i=1, 2, ..., l; l denotes a sampling length of the surface wireless monitoring unit; j=1, 2, ..., p; p denotes a sampling length of the underground wired monitoring unit; the GPS timestamps are created for some sampling points of each of the first rock-burst waveform data segment and the second rock-burst waveform data segment; the timestamps created for a sampling point index$_{i'}^s$ of the first rock-burst waveform data segment $y_i^s$ form a GPS timing sequence $T_{i'}^s$; i'=1,2,...,m; index$^s$ denotes a position number corresponding to the timestamp of the first rock-burst waveform data segment $y_i^s$; m denotes a number of sampling points with a GPS timestamp of the first rock-burst waveform data segment monitored by the surface wireless monitoring unit; the timestamps created for a sampling point index$_{j'}^u$ of the second rock-burst waveform data segment $y_j^u$ form a GPS timing sequence $T_{j'}^u$; j'=1, 2, ..., n; index$^u$ denotes a position number corresponding to the timestamp of the second rock-burst waveform data segment $y_j^u$; and n denotes a number of sampling points with a GPS timestamp of the second rock-burst waveform data segment monitored by the underground wired monitoring unit.

Further, in step (2), the adding, on an equal-interval basis, a sampling time to a sampling point missing a timestamp between each pair of adjacent GPS timestamps includes:

201) calculating a time difference and a number of sampling points between each pair of adjacent timestamps in each of the GPS timing sequences $T_{i'}^{s}$ and $T_{j'}^{u}$:

time difference: $\Delta T^{s}=T_{i'+1}^{s}-T_{i'}^{s}$; $\Delta T^{u}=T_{j'+1}^{u}-T_{j'}^{u}$;

number of sampling points: $\Delta N^{s}=\text{index}_{i'+1}^{s}-\text{index}_{i'}^{s}+1$; $\Delta N^{u}=\text{index}_{j'+1}^{u}-\text{index}_{j'}^{u}+1$;

202) bringing the time difference and the number of sampling points into the following equation:

$$T_{i'}^{s} + \frac{\Delta T^{s}}{\Delta N^{s}-1}k = T_{i'}^{s} + \frac{T_{i'+1}^{s}-T_{i'}^{s}}{\text{index}_{i'+1}^{s}-\text{index}_{i'}^{s}}k$$

calculating the sampling time of a k-th sampling point after the sampling point $\text{index}_{i'}^{s}$ in the first rock-burst waveform data segment $y_{i}^{s}$ on an equal-interval basis, until a sampling point $\text{index}_{i'+1}^{s}-1$;

bringing the time difference and the number of sampling points into the following equation:

$$T_{j'}^{u} + \frac{\Delta T^{u}}{\Delta N^{u}-1}k = T_{j'}^{u} + \frac{T_{j'+1}^{u}-T_{j'}^{u}}{\text{index}_{j'+1}^{u}-\text{index}_{j'}^{u}}k$$

calculating the sampling time of a k-th sampling point after the sampling point $\text{index}_{j'}^{u}$ in the second rock-burst waveform data segment $y_{j}^{u}$ on an equal-interval basis, until a sampling point $\text{index}_{j'+1}^{u}-1$; and 203) repeating steps 201) and 202) until all sampling points missing a timestamp between each pair of adjacent GPS timestamps in each of the first rock-burst waveform data segment and the second rock-burst waveform data segment are added with a sampling time.

Further, in step (3), the adding, on an equal-interval basis, a sampling time to a sampling point missing a timestamp except first and last GPS timestamps in each of the first rock-burst waveform data segment and the second rock-burst waveform data segment includes:

301) calculating the average sampling frequency $\bar{f}_{s}$ of the first rock-burst waveform data segment and the average sampling frequency $\bar{f}_{u}$ of the second rock-burst waveform data segment:

$$\bar{f}_{s} = \frac{\sum_{i'=1}^{m-1} \frac{\text{index}_{i'+1}^{s}-\text{index}_{i'}^{s}}{T_{i'+1}^{s}-T_{i'}^{s}}}{m-1};$$

$$\bar{f}_{u} = \frac{\sum_{j'=1}^{n-1} \frac{\text{index}_{j'+1}^{u}-\text{index}_{j'}^{u}}{T_{j'+1}^{u}-T_{j'}^{u}}}{n-1};$$

302) adding, according to $$T_{1}^{s} - \frac{1}{\bar{f}_{s}}*k$$

and on an equal-interval basis, a sampling time to a k-th sampling point before the first GPS timestamp of the first rock-burst waveform data segment monitored by the surface wireless monitoring unit, until a first sampling point of the first rock-burst waveform data segment; and adding, according to $$T_{m}^{s} + \frac{1}{\bar{f}_{s}}*k$$

and on an equal-interval basis, a sampling time to a k-th sampling point after the last GPS timestamp of the first rock-burst waveform data segment monitored by the surface wireless monitoring unit, until a last sampling point of the first rock-burst waveform data segment; and adding, according to $$T_{1}^{u} - \frac{1}{\bar{f}_{u}}*k$$

and on an equal-interval basis, a sampling time to a k-th sampling point before the first GPS timestamp of the second rock-burst waveform data segment monitored by the underground wired monitoring unit, until a first sampling point of the second rock-burst waveform data segment; and adding, according to $$T_{n}^{u} + \frac{1}{\bar{f}_{u}}*k$$

and on an equal-interval basis, a sampling time to a k-th sampling point after the last GPS timestamp of the second rock-burst waveform data segment monitored by the underground wired monitoring unit, until a last sampling point of the second rock-burst waveform data segment.

Further, in step (4), the uniform sampling frequency is f; after addition, the sampling time corresponding to the first rock-burst waveform data segment $y_{i}^{s}$ is denoted as $\overline{T}_{i}^{s}$, and the sampling time corresponding to the second rock-burst waveform data segment $y_{j}^{u}$ is denoted as $\overline{T}_{j}^{u}$; and the resampling sampling times includes:

401) calculating a minimum value $t_{min}^{s}$ and a maximum value $t_{max}^{s}$ of the sampling time $\overline{T}_{i}^{s}$ and a minimum value $t_{min}^{u}$ and a maximum value $t_{max}^{u}$ of the sampling time $\overline{T}_{j}^{u}$;

402) determining a start value $$\overline{\overline{T}}_{1}^{s} = t_{min}^{s} - \text{mod}\left(t_{min}^{s} - \frac{1}{f}\right)$$

and an end value $$\overline{\overline{T}}_{end}^{s} = t_{max}^{s} - \text{mod}\left(t_{max}^{s}, \frac{1}{f}\right)$$

of a sampling time $\overline{T}_{i}^{s}$ and a start value $$\overline{\overline{T}}_{1}^{u} = t_{min}^{u} - \text{mod}\left(t_{min}^{u} - \frac{1}{f}\right)$$

and an end value $$\overline{\overline{T}}_{end}^{u} = t_{max}^{u} - \text{mod}\left(t_{max}^{u}, \frac{1}{f}\right)$$

of a sampling time $\overline{T}_j^u$ for resampling, where mod denotes a modulus operation;

403) determining the sampling time $\overline{T}_i^s$ for resampling:

$$\overline{T}_i^s = = t_{min}^s - \mod\left(t_{min}^s - \frac{1}{f}\right) + (i-1)\frac{1}{f};$$

where, i=1, 2, . . . , l, l=($T_{end}^s - T_1^s$)×f+1;
determining the sampling time $\overline{T}_j^u$ for resampling:

$$\overline{T}_j^u = t_{min}^u - \mod\left(t_{min}^u - \frac{1}{f}\right) + (j-1)\frac{1}{f};$$

where, j=1, 2, . . . p, p=($T_{end}^u - T_1^u$)×f+1.

Further, step (5) includes calculating a corresponding rock-burst waveform data segment according to the sampling times $\overline{T}_i^s$ and $\overline{T}_j^u$:

501) determining a subscript position index satisfying $T_{index}^x < \overline{T}_k^x < T_{index+1}^x$;

where, k=1, 2, . . . , z; index=1, 2, . . . , z−1; z=l or p; x=u or s;

502) bringing the subscript position index into the linear interpolation formula:

$$\frac{y_{index+1}^x - y_{index}^x}{\overline{T}_{index+1}^x - \overline{T}_{index}^x}\overline{T}_k^x = +y_{index}^x - \frac{y_{index+1}^x - y_{index}^x}{\overline{T}_{index+1}^x - \overline{T}_{index}^x}\overline{T}_{index}^x$$

obtaining a rock-burst waveform data segment $\overline{y}_k^x$.

The present disclosure acquires the two rock-burst waveform data segments with timestamps through the surface wireless monitoring unit and underground wired monitoring unit of the borehole-surface micro-seismic monitoring system. The present disclosure calculates the time difference and the number of sampling points between each pair of adjacent GPS timestamps in each of the two rock-burst waveform data segments. The present disclosure adds a sampling time to a sampling point missing a timestamp between each pair of adjacent GPS timestamps on an equal-interval basis. The present disclosure calculates the average sampling frequencies of the two rock-burst waveform data segments, and adds the sampling time to the sampling point missing a timestamp except the first and last GPS timestamps in each of the two data segments on an equal-interval basis. The present disclosure obtains the sampling times of all sampling points, and resamples the sampling times according to a uniform sampling frequency. The present disclosure calculates the rock-burst waveform data segment at the new sampling time with the linear interpolation formula, so as to align the sampling times of the two rock-burst waveform data segments. The present disclosure solves the problem that the GPS-timed waveform data acquired by the surface wireless monitoring unit and the underground wired monitoring unit of the borehole-surface micro-seismic monitoring system are not aligned or synchronized. The present disclosure effectively improves the accuracy of the subsequent rock-burst source parameter solution, ensures the accuracy of the rock-burst location and energy solution, and improves the precision of micro-seismic monitoring. In addition, the present disclosure has a wide range of application and is easy to program by a computer.

DETAILED DESCRIPTION OF THE EMBODIMENTS

The present disclosure is further described below with reference to the drawings.

Figure 1:
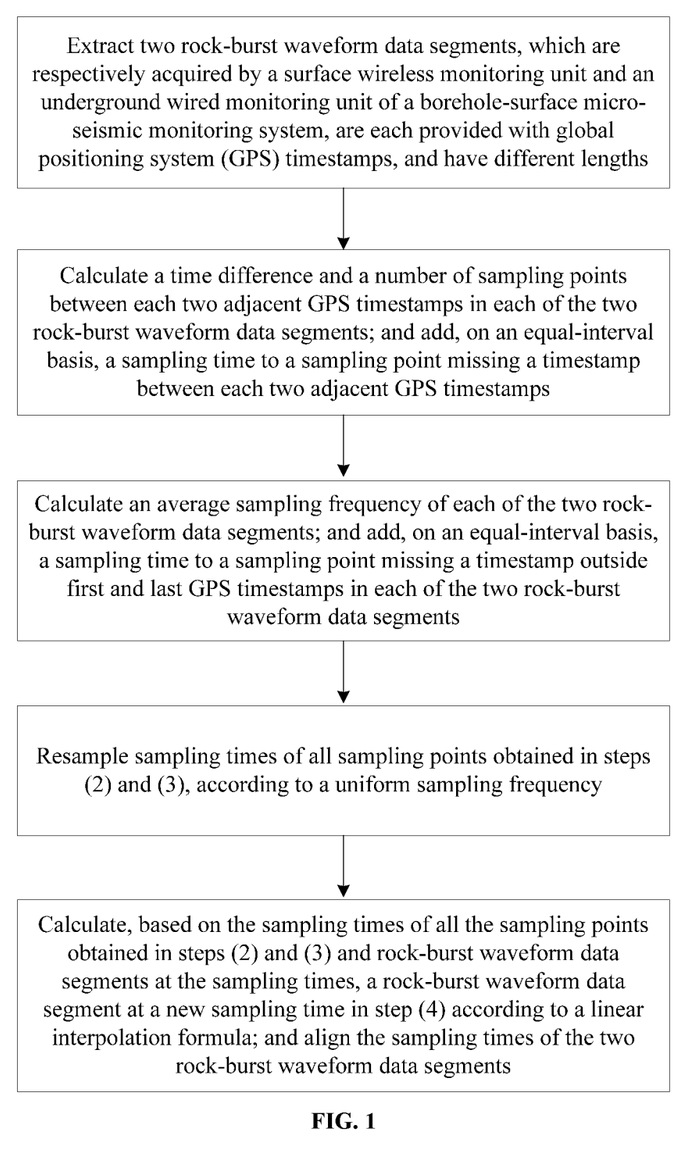
FIG. 1 is a flowchart of a timing alignment method for data acquired by monitoring units of a borehole-surface micro-seismic monitoring system according to the present disclosure.

As shown in FIG. 1, a timing alignment method for data acquired by monitoring units of a borehole-surface micro-seismic monitoring system includes the following steps:

(1) A first rock-burst waveform data segment and a second rock-burst waveform data segment are extracted, which are respectively acquired by a surface wireless monitoring unit and an underground wired monitoring unit of the borehole-surface micro-seismic monitoring system, are each provided with multiple global positioning system (GPS) timestamps, and have different lengths.

(2) A time difference and a number of sampling points between each pair of adjacent GPS timestamps in each of the first rock-burst waveform data segment and the second rock-burst waveform data segment are calculated, and on an equal-interval basis, a sampling time is added to a sampling point missing a timestamp between each pair of adjacent GPS timestamps.

(3) An average sampling frequency of each of the first rock-burst waveform data segment and the second rock-burst waveform data segment is calculated, and on an equal-interval basis, a sampling time is added to a sampling point missing a timestamp except first and last GPS timestamps in each of the first rock-burst waveform data segment and the second rock-burst waveform data segment.

(4) Sampling times of all sampling points obtained in steps (2) and (3) are resampled according to a uniform sampling frequency.

(5) Based on the sampling times of all the sampling points obtained in steps (2) and (3) and rock-burst waveform data segments at the sampling times, a rock-burst waveform data segment at a new sampling time according to step (4) is calculated with a linear interpolation formula; and the sampling times of the first rock-burst waveform data segment and the second rock-burst waveform data segment are aligned.

Further, in step (1), the surface wireless monitoring unit and the underground wired monitoring unit carry out independent high-precision GPS timing separately, and sample at sampling frequencies $f_s$ and $f_u$, respectively; the first rock-burst waveform data segment and the second rock-burst waveform data segment are denoted as $y_i^s$ and $y_j^u$, respectively; i=1, 2, . . . , l; l denotes a sampling length of the surface wireless monitoring unit; j=1, 2, . . . , p; p denotes a sampling length of the underground wired monitoring unit; the GPS timestamps are created for some sampling points of each of the first rock-burst waveform data segment and the second rock-burst waveform data segment; the timestamps created for sampling point $index_{i'}^s$ of the first rock-burst waveform data segment $y_i^s$ form a GPS timing sequence $T_{i'}^s$; i'=1, 2, . . . , m; $index^s$ denotes a position number corresponding to the timestamp of the first rock-burst waveform data segment $y_i^s$; m denotes a number of sampling points with a GPS timestamp of the first rock-burst waveform data segment monitored by the surface wireless monitoring unit; the timestamps created for sampling point $index_{j'}^u$ of the second rock-burst waveform data segment $y_j^u$ form a GPS timing sequence $T_{j'}^u$; j'=1, 2, . . . , n; $index^u$ denotes a position number corresponding to the timestamp of the second rock-burst waveform data segment $y_j^u$; and n denotes a number of sampling points with a GPS timestamp of the second rock-burst waveform data segment monitored by the underground wired monitoring unit.

Further, in step (2), on an equal-interval basis, the sampling time is added to a sampling point missing a timestamp between each pair of adjacent GPS timestamps.

201) A time difference and a number of sampling points between each pair of adjacent timestamps in each of the GPS timing sequences $T_{i'}^s$ and $T_{j'}^u$ are calculated as follows:
time difference: $\Delta T^s = Y_{i'+1}^s - T_{i'}^s$; $\Delta T^u = T_{j'+1}^u - T_{j'}^u$;
number of sampling points: $\Delta N^s = index_{i'+1}^s - index_{i'}^s + 1$; $\Delta N^u = index_{j'+1}^u - index_{j'}^u + 1$.

202) The time difference and the number of sampling points are brought into the following equation:

$$T_{i'}^s + \frac{\Delta T^s}{\Delta N^s - 1} k = T_{i'}^s + \frac{T_{i'+1}^s - T_{i'}^s}{index_{i'+1}^s - index_{i'}^s} k$$

The sampling time of a k-th sampling point after the sampling point $index_{i'}^s$ in the first rock-burst waveform data segment $y_i^s$ is calculated on an equal-interval basis, until sampling point $index_{i'+1}^s - 1$.

The time difference and the number of sampling points are brought into the following equation:

$$T_{j'}^u + \frac{\Delta T^u}{\Delta N^u - 1} k = T_{j'}^u + \frac{T_{j'+1}^u - T_{j'}^u}{index_{j'+1}^u - index_{j'}^u} k$$

The sampling time of a k-th sampling point after the sampling point $index_{j'}^u$ in the second rock-burst waveform data segment $y_j^u$ is calculated on an equal-interval basis, until sampling point $index_{j'+1}^u - 1$.

203) Steps 201) and 202) are repeated until all sampling points missing a timestamp between each pair of adjacent GPS timestamps in each of the first rock-burst waveform data segment and the second rock-burst waveform data segment are added with a sampling time.

Further, in step (3), on an equal-interval basis, a sampling time is added to a sampling point missing a timestamp except first and last GPS timestamps in each of the first rock-burst waveform data segment and the second rock-burst waveform data segment.

301) The average sampling frequency $\bar{f}_s$ of the first rock-burst waveform data segment and the average sampling frequency $\bar{f}_u$ of the second rock-burst waveform data segment are calculated as follows:

$$\bar{f}_s = \frac{\sum_{k'=1}^{m-1} \frac{index_{i'+1}^s - index_{i'}^s}{T_{i'+1}^s - T_{i'}^s}}{m-1};$$

$$\bar{f}_u = \frac{\sum_{j'=1}^{n-1} \frac{index_{j'+1}^u - index_{j'}^u}{T_{j'+1}^u - T_{j'}^u}}{n-1};$$

302) According to $$T_1^s - \frac{1}{\bar{f}_s} * k$$

and on an equal-interval basis, a sampling time is added to a k-th sampling point before the first GPS timestamp of the first rock-burst waveform data segment monitored by the surface wireless monitoring unit, until a first sampling point of the first rock-burst waveform data segment. According to $$T_m^s + \frac{1}{\bar{f}_s} * k$$

and on an equal-interval basis, a sampling time is added to a k-th sampling point after the last GPS timestamp of the first rock-burst waveform data segment monitored by the surface wireless monitoring unit, until a last sampling point of the first rock-burst waveform data segment.
According to $$T_1^u - \frac{1}{\bar{f}_u} * k$$

and on an equal-interval basis, a sampling time is added to a k-th sampling point before the first GPS timestamp of the second rock-burst waveform data segment monitored by the underground wired monitoring unit, until a first sampling point of the second rock-burst waveform data segment. According to $$T_n^u + \frac{1}{\bar{f}_u} * k$$

and on an equal-interval basis, a sampling time is added to a k-th sampling point after the last GPS timestamp of the second rock-burst waveform data segment monitored by the underground wired monitoring unit, until a last sampling point of the second rock-burst waveform data segment.

Further, in step (4), the uniform sampling frequency is f; after addition, the sampling time corresponding to the first rock-burst waveform data segment $y_i^s$ is denoted as $\bar{T}_i^s$, and the sampling time corresponding to the second rock-burst waveform data segment $y_j^u$ is denoted as $\overline{T}_j^u$; and the resampling of the sampling times is as follows:

401) A minimum value $t_{min}^s$ and a maximum value $t_{max}^s$ of the sampling time $T_i^s$ and a minimum value $t_{min}^u$ and a maximum value $t_{max}^u$ of the sampling time $T_j^u$ are calculated.

402) A start value $$\overline{T}_1^s = t_{min}^s - \text{mod}\left(t_{min}^s - \frac{1}{f}\right)$$

and an end value $$\overline{T}_{end}^s = t_{max}^s - \text{mod}\left(t_{max}^s, \frac{1}{f}\right)$$

of a sampling time $\overline{T}_i^s$ and a start value $$\overline{T}_1^u = t_{min}^u - \text{mod}\left(t_{min}^u - \frac{1}{f}\right)$$

and an end value $$\overline{T}_{end}^u = t_{max}^u - \text{mod}\left(t_{max}^u, \frac{1}{f}\right)$$

of a sampling time $\overline{T}_j^u$ for resampling are determined, where mod denotes a modulus operation.

403) The sampling time $\overline{T}_i^s$ for resampling is determined as follows:

$$\overline{T}_i^s = t_{min}^s - \text{mod}\left(t_{min}^s - \frac{1}{f}\right) + (i-1)\frac{1}{f};$$

where, i=1, 2, . . . , l, l=$(\overline{T}_{end}^s - \overline{T}_1^s) \times f + 1$;

The sampling time $\overline{T}_j^u$ for resampling is determined as follows:

$$\overline{T}_j^u = t_{min}^u - \text{mod}\left(t_{min}^u - \frac{1}{f}\right) + (j-1)\frac{1}{f};$$

where, j=1, 2, . . . p, p=$(\overline{T}_{end}^u - \overline{T}_1^u) \times f + 1$.

Further, in step (5), a corresponding rock-burst waveform data segment is calculated according to the sampling times $\overline{T}_i^s$ and $\overline{T}_j^u$:

501) A subscript position index satisfying $T_{index}^x < \overline{T}_k^x < T_{index+1}^x$ is determined;

where, k=1, 2, . . . , z; index=1, 2, . . . , z−1; z=l or p; x=u or s.

502) The subscript position index is brought into the linear interpolation formula:

$$\frac{y_{index+1}^x - y_{index}^x}{T_{index+1}^x - T_{index}^x}\overline{T}_k^x + y_{index}^x - \frac{y_{index+1}^x - y_{index}^x}{T_{index+1}^x - T_{index}^x}T_{index}^x$$

A rock-burst waveform data segment $\overline{y}_k^x$ is obtained.

The sampling times $T_{index}^x$ and $T_{index+1}^x$ are simplified into $T_i^x$ and $T_j^u$, respectively. If x takes s, $T_{index}^s$ is the sampling time $T_i^s$ corresponding to each sampling point after addition of the timestamp to the data acquired by the surface wireless monitoring unit. The value of index is determined by i=1, 2, . . . , l, that is, index=1, 2, . . . , l−1.

If x takes u, $T_{index}^u$ is the sampling time $T_j^u$ corresponding to each sampling point after addition of the timestamp to the data acquired by the underground wired monitoring unit. The value of index is determined by j=1, 2, . . . , p, that is, index=1, 2, . . . , p−1.

Figure 2:
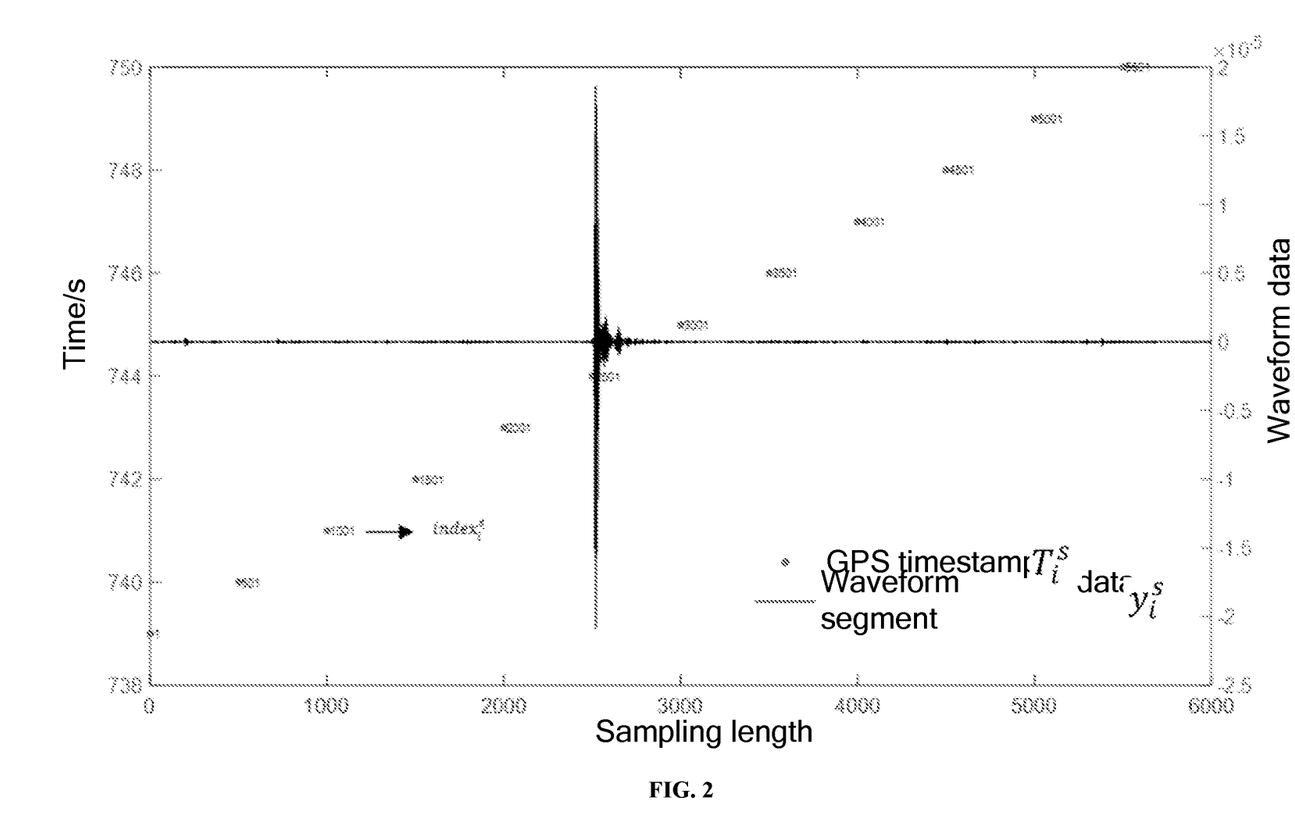
FIG. 2 shows rock-burst waveform data monitored by a surface wireless monitoring unit and GPS timestamps according to an embodiment of the present disclosure.

Embodiment (1) As shown in FIG. 2, rock-burst waveform data segment $y_i^s$, i=1, 2, . . . , 6000 with GPS timestamps acquired by the surface wireless monitoring unit of the borehole-surface micro-seismic monitoring system at a sampling frequency of $f_s$=500 Hz is extracted, where the timestamps of sampling point index$_{i'}^s$, i'=1, 2, . . . , 12 in $y_i^s$ form sequence $T_i^s$.

Figure 3:
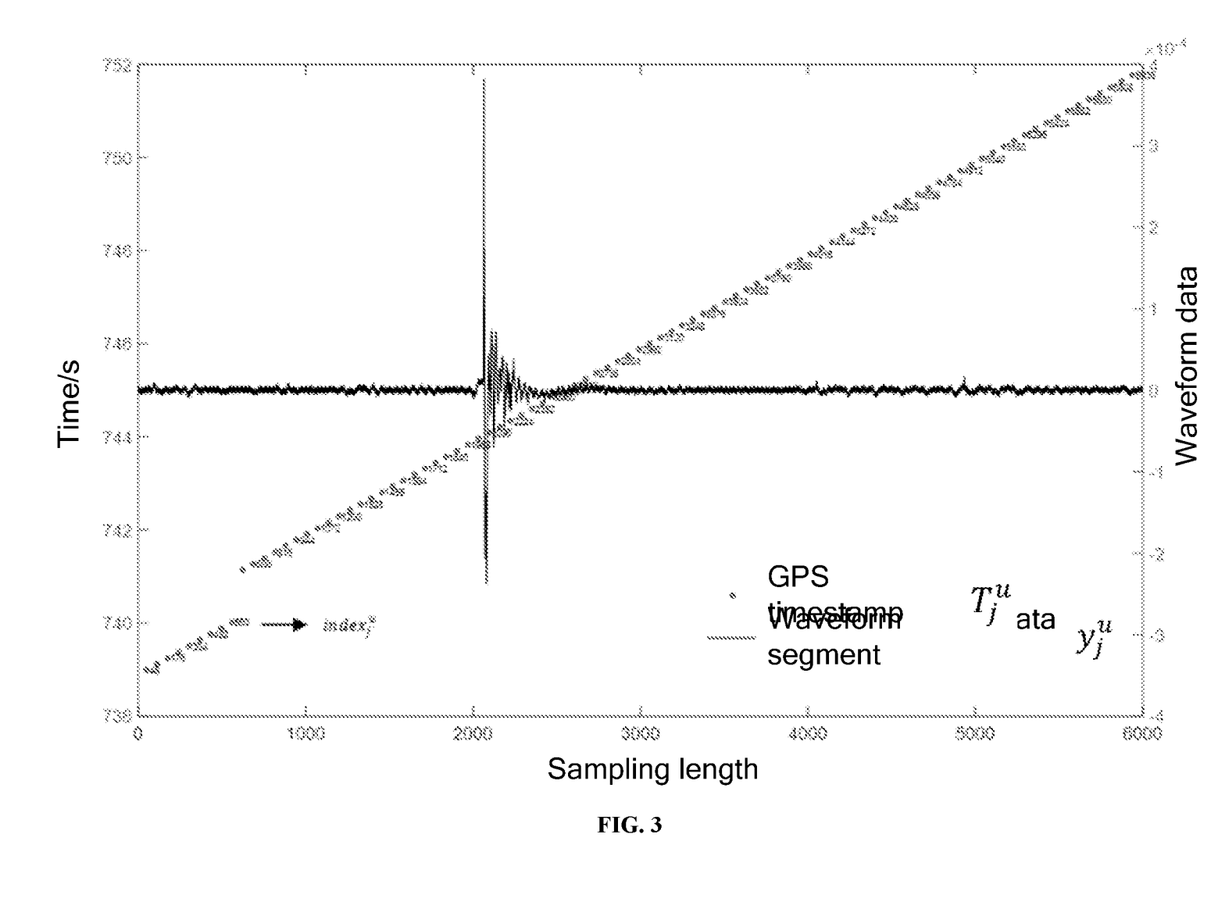
FIG. 3 shows rock-burst waveform data monitored by an underground wired monitoring unit and GPS timestamps according to an embodiment of the present disclosure.

As shown in FIG. 3, rock-burst waveform data segment $y_j^u$, j=1, 2, . . . , 6000 with GPS timestamps acquired by the underground wired monitoring unit of the borehole-surface micro-seismic monitoring system at a sampling frequency of $f_u$=500 Hz is extracted, where the timestamps of sampling point index$_{j'}^u$, j'=1, 2, . . . , 94 in $y_j^u$ form sequence $T_j^u$.

(2) A sampling time is added, on an equal-interval basis, to a sampling point missing a timestamp between each pair of adjacent GPS timestamps.

201) A time difference between GPS timestamp $T_1^s$ and an adjacent timestamp of the waveform data segment $y_i^s$ is calculated as $\Delta T^s = T_2^s - T_1^s = 1s$, and a number of sampling points between the two adjacent timestamps is calculated as $\Delta N^s = \text{index}_2^s - \text{index}_1^s + 1 = 501 - 1 + 1 = 501$. A time difference between GPS timestamp $T_1^u$ and an adjacent timestamp of the waveform data segment $y_j^u$ (j=1, 2, . . . , 6000) is calculated as $\Delta T^u = T_2^u - T_1^u = 0.128s$, and a number of sampling points between the two adjacent timestamps is calculated as $\Delta N^u = \text{index}_2^u - \text{index}_1^u + 1 = 112 - 48 + 1 = 65$.

202) The time difference and the number of sampling points are brought into the following equation:

$$T_1^s + \frac{\Delta T^s}{\Delta N^s - 1} \times k = T_1^s + \frac{T_2^s - T_1^s}{\text{index}_2^s - \text{index}_1^s} \times k = 739 + \frac{1}{500} \times k$$

The sampling time of a k-th sampling point after the sampling point index$_1^s$=1 in $y_i^s$ (i=1, 2, . . . , 6000) is calculated on an equal-interval basis, until sampling point index$_2^s$−1=501−1=500.

The time difference and the number of sampling points are brought into the following equation:

$$T_1^u + \frac{\Delta T^u}{\Delta N^u - 1} \times k = T_1^u + \frac{T_2^u - T_1^u}{\text{index}_2^u - \text{index}_1^u} \times k = 738.992 + \frac{0.128}{64} \times k$$

The sampling time of a k-th sampling point after the sampling point index$_1^u$=48 in $y_j^u$ (j=1, 2, . . . , 6000) is calculated on an equal-interval basis, until sampling point index$_2^u$−1=112−1=111.

203) Steps 201) and 202) are repeated until all sampling points missing a timestamp between each pair of adjacent GPS timestamps in each of the two waveform data segments are added with a sampling time.

(3) A sampling time is added, on an equal-interval basis, to a sampling point missing a timestamp except first and last GPS timestamps in each of the waveform data segments $y_i^s$ and $y_j^u$.

301) The average sampling frequency $\bar{f}_s$ of the waveform data segment $y_i^s$ and the average sampling frequency $\bar{f}_u$ of the waveform data segment $y_j^u$ are calculated, respectively.

$$\bar{f}_s = \frac{\sum_{i'=1}^{12-1} \frac{\text{index}_{i'+1}^s - \text{index}_{i'}^s}{T_{i'+1}^s - T_{i'}^s}}{12-1} = 500;$$

$$\bar{f}_u = \frac{\sum_{j'=1}^{94-1} \frac{\text{index}_{j'+1}^u - \text{index}_{j'}^u}{T_{j'+1}^u - T_{j'}^u}}{94-1} = 461.2523$$

302) According to $$T_1^s - \frac{k}{\bar{f}_s} = 739 - k \times 0.002$$

and on an equal-interval basis, a sampling time is added to a k-th sampling point before the first GPS timestamp in the waveform data segment $y_i^s$ monitored by the surface wireless monitoring unit, until a first sampling point in the waveform data segment. According to $$T_{12}^s + \frac{k}{\bar{f}_s} = 750 + k \times 0.002$$

and on an equal-interval basis, a sampling time is added to a k-th sampling point after the last GPS timestamp in the waveform data segment $y_i^s$ monitored by the surface wireless monitoring unit, until a last sampling point in the waveform data segment. According to $$T_1^u - \frac{k}{\bar{f}_u} = 738.992 - 0.002168 \times k$$

and on an equal-interval basis, a sampling time is added to a k-th sampling point before the first GPS timestamp in the waveform data segment $y_j^u$ monitored by the underground wired monitoring unit, until a first sampling point in the waveform data segment. According to $$T_{94}^u + \frac{k}{\bar{f}_u} = 751.896 + 0.002168 \times k$$

and on an equal-interval basis, a sampling time is added to a k-th sampling point after the last GPS timestamp in the waveform data segment $y_j^u$ monitored by the underground wired monitoring unit, until a last sampling point in the waveform data segment.

Figure 4:
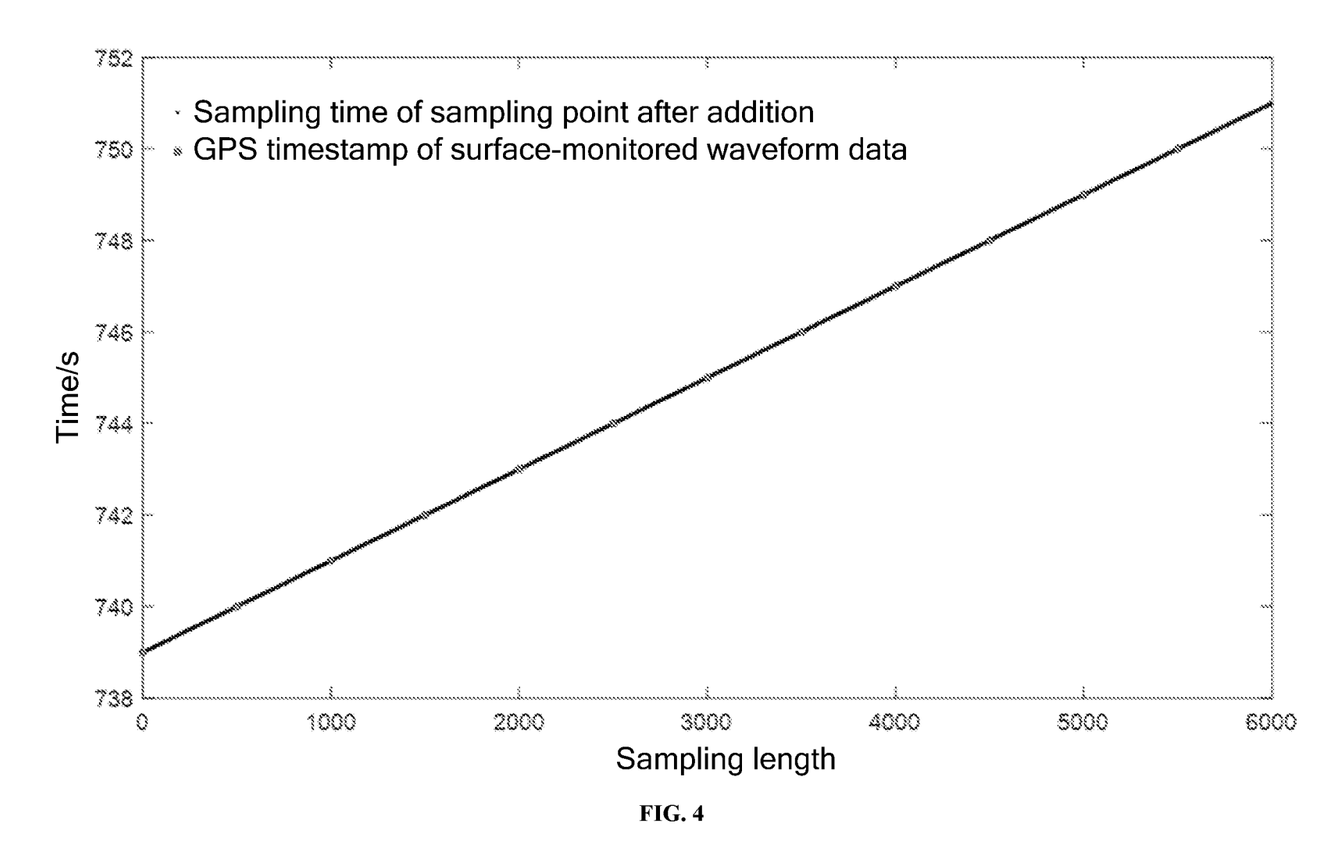
FIG. 4 shows the rock-burst waveform data, acquired by the surface wireless monitoring unit, with all sampling points with a sampling time after addition of missing sampling times, according to the embodiment of the present disclosure.
Figure 5:
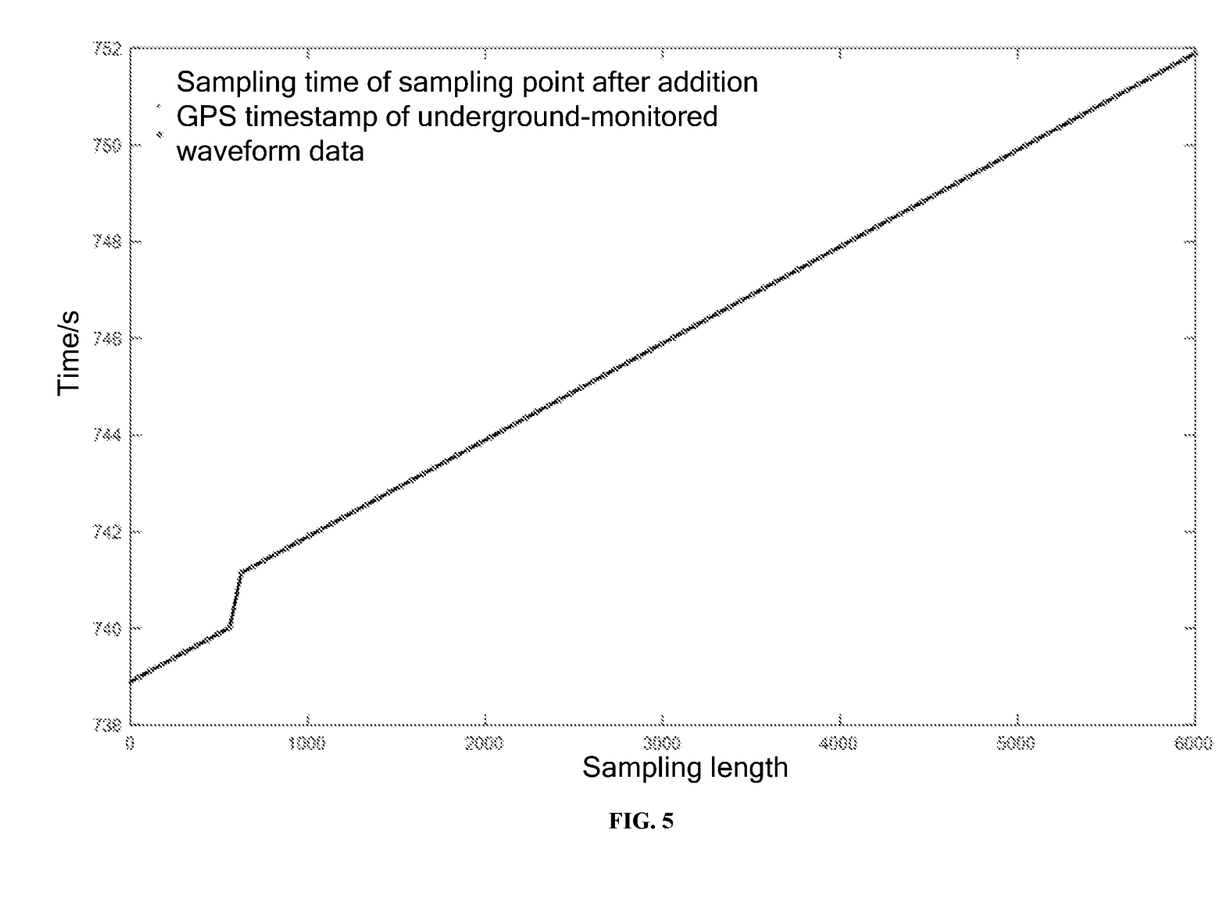
FIG. 5 shows the rock-burst waveform data, acquired by the underground wired monitoring unit, with all sampling points with a sampling time after addition of missing sampling times, according to the embodiment of the present disclosure.

(4) As shown in FIGS. 4 and 5, the sampling times $\overline{T}_i^s$ and $\overline{T}_j^u$ of all sampling points are obtained by means of addition in steps (2) and (3), and the sampling times are resampled according to a uniform sampling frequency f=500 Hz.

401) A minimum value $t_{min}^s=739$ and a maximum value $t_{max}^s=750.998$ of the sampling time $\overline{T}_i^s$, as well as a minimum value $t_{min}^u=738.8901$ and a maximum value $t_{max}^u=751.896$ of the sampling time $\overline{T}_j^u$, are calculated.

402) A start value of the sampling time $\overline{\overline{T}}_i^s$ for resampling is determined as:

$$\overline{\overline{T}}_1^s = t_{min}^s - \text{mod}\left(t_{min}^s, \frac{1}{f}\right) = 739 - \text{mod}(739, 0.002) = 739,$$

An end value of the sampling time for resampling is determined as:

$$\overline{\overline{T}}_{end}^s = t_{max}^s - \text{mod}\left(t_{max}^s, \frac{1}{f}\right) = 750.998 - \text{mod}(750.998, 0.002) = 750.998.$$

A start value of the sampling time $\overline{\overline{T}}_j^u$ for resampling is determined as:

$$\overline{\overline{T}}_1^u = = t_{min}^u - \text{mod}\left(t_{min}^u, \frac{1}{f}\right) = 738.8901 - \text{mod}(738.8901, 0.002) = 738.89;$$

An end value of the sampling time for resampling is determined as:

$$\overline{\overline{T}}_{end}^u = t_{max}^u - \text{mod}\left(t_{max}^u, \frac{1}{f}\right) = 751.896 - \text{mod}(751.896, 0.002) = 751.896$$

403) The sampling time $\overline{\overline{T}}_i^s$ for resampling is determined as:

$$\overline{\overline{T}}_i^s = \overline{\overline{T}}_1^s + (i-1)\frac{1}{f} = 739 + (i-1) \times 0.002, i = 1, 2, \ldots, l,$$

$$l = \left(\overline{\overline{T}}_{end}^s - \overline{\overline{T}}_1^s\right) \times f + 1 = 6000$$

The sampling time $\overline{\overline{T}}_j^u$ for resampling is determined as:

$$\overline{\overline{T}}_j^u = \overline{\overline{T}}_1^u + (j-1)\frac{1}{f} = 738.89 + (i-1) \times 0.002,, j = 1, 2, \ldots p,$$

$$p = \left(\overline{\overline{T}}_{end}^u - \overline{\overline{T}}_1^u\right) \times f + 1 = 6505.$$

(5) The new sampling times $\overline{\overline{T}}_i^s$, i=1, 2, ..., 6000 and $\overline{\overline{T}}_j^u$, j=1, 2, ..., 6505 in step (4) are calculated according to the linear interpolation formula, and the corresponding waveform data are calculated so as to align the sampling times.

501) A subscript position index satisfying $\overline{T}_{index}^x \leq \overline{\overline{T}}_k^x < \overline{T}_{index+1}^x$, k=1, 2, ..., l or p, l=6000, p=6505, index=1, 2, ..., 5999, x=u or s, is determined.

502) The subscript position index is brought into the linear interpolation formula:

$$\frac{y_{index+1}^x - y_{index}^x}{\overline{T}_{index+1}^x - \overline{T}_{index}^x} \overline{\overline{T}}_k^x + y_{index}^x - \frac{y_{index+1}^x - y_{index}^x}{\overline{T}_{index+1}^x - \overline{T}_{index}^x} \overline{T}_{index}^x$$

Figure 6:
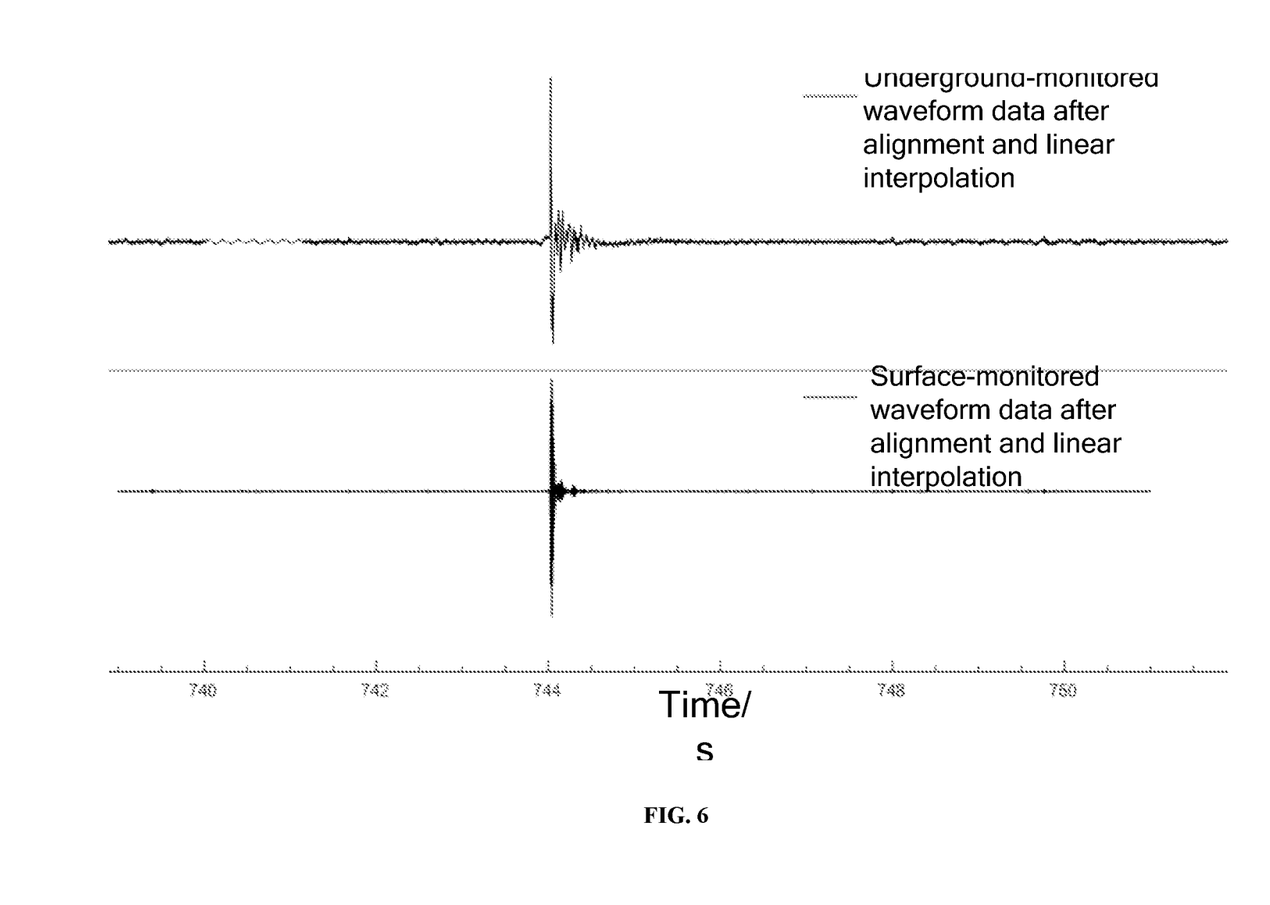
FIG. 6 shows the rock-burst waveform data acquired by the surface wireless monitoring unit and the underground wired monitoring unit after timing alignment, where a horizontal axis represents time, and a vertical axis represents amplitude.

The waveform data segment $\bar{y}_k^x$, k=1, 2, ..., l or p, l=6000, p=6505, x=u or s shown in FIG. 6 is calculated.

What is claimed is:

1. A timing alignment method for data acquired by monitoring units of a borehole-surface micro-seismic monitoring system, comprising the following steps:
    (1) extracting a first rock-burst waveform data segment and a second rock-burst waveform data segment that are respectively acquired by a surface wireless monitoring unit and an underground wired monitoring unit of the borehole-surface micro-seismic monitoring system and each provided with multiple global positioning system (GPS) timestamps, wherein the first rock-burst waveform data segment and the second rock-burst waveform data segment have different lengths;
    (2) calculating a time difference and a number of sampling points between each pair of adjacent GPS timestamps in each of the first rock-burst waveform data segment and the second rock-burst waveform data segment; and adding, on an equal-interval basis, a sampling time to a sampling point missing a timestamp between each pair of adjacent GPS timestamps;
    (3) calculating an average sampling frequency of each of the first rock-burst waveform data segment and the second rock-burst waveform data segment; and adding, on an equal-interval basis, a sampling time to a sampling point missing a timestamp except first and last GPS timestamps in each of the first rock-burst waveform data segment and the second rock-burst waveform data segment;
    (4) resampling sampling times of all sampling points obtained in steps (2) and (3), according to a uniform sampling frequency; and
    (5) calculating, based on the sampling times of all of the sampling points obtained in steps (2) and (3) and rock-burst waveform data segments at the sampling times, a rock-burst waveform data segment at a new sampling time according to step (4) with a linear interpolation formula; and aligning the sampling times of the first rock-burst waveform data segment and the second rock-burst waveform data segment.

2. The timing alignment method for data acquired by monitoring units of the borehole-surface micro-seismic monitoring system according to claim 1, wherein in step (1), the surface wireless monitoring unit and the underground wired monitoring unit carry out independent high-precision GPS timing separately, and sample at sampling frequencies $f_s$ and $f_u$, respectively; the first rock-burst waveform data segment and the second rock-burst waveform data segment are denoted as $y_i^s$ and $y_j^u$, respectively; i=1, 2, . . . , l; l denotes a sampling length of the surface wireless monitoring unit; j=1, 2, . . . , p; p denotes a sampling length of the underground wired monitoring unit; the GPS timestamps are created for some sampling points of each of the first rock-burst waveform data segment and the second rock-burst waveform data segment; the timestamps created for a sampling point $index_i^s$ of the first rock-burst waveform data segment $y_i^s$ form a GPS timing sequence $T_i^s$; i'=1, 2, . . . , m; $index^s$ denotes a position number corresponding to the timestamp of the first rock-burst waveform data segment $y_i^s$; m denotes a number of sampling points with a GPS timestamp of the first rock-burst waveform data segment monitored by the surface wireless monitoring unit; the timestamps created for a sampling point $index_j^u$ of the second rock-burst waveform data segment $y_j^u$ form a GPS timing sequence $T_j^u$; j'=1, 2, . . . , n; $index^u$ denotes a position number corresponding to the timestamp of the second rock-burst waveform data segment $y_j^u$; and n denotes a number of sampling points with a GPS timestamp of the second rock-burst waveform data segment monitored by the underground wired monitoring unit.

3. The timing alignment method for data acquired by monitoring units of the borehole-surface micro-seismic monitoring system according to claim 2, wherein in step (2), the adding, on an equal-interval basis, a sampling time to a sampling point missing a timestamp between each pair of adjacent GPS timestamps further comprises:
    201) calculating a time difference and a number of sampling points between each pair of adjacent timestamps in each of the GPS timing sequences $T_i^s$ and $T_j^u$:
    time difference: $\Delta T^s = T_{i'+1}^s - T_{i'}^s$; $\Delta T^u = T_{j'+1}^u - T_{j'}^u$;
    number of sampling points: $\Delta N^s = index_{i'+1}^s - index_{i'}^s + 1$; $\Delta N^u = index_{j'+1}^u - index_{j'}^u + 1$;
    202) bringing the time difference and the number of sampling points into the following equation:

$$T_{i'}^s + \frac{\Delta T^s}{\Delta N^s - 1} k = T_{i'}^s + \frac{T_{i'+1}^s - T_{i'}^s}{index_{i'+1}^s - index_{i'}^s} k$$

calculating the sampling time of a k-th sampling point after the sampling point $index_i^s$ in the first rock-burst waveform data segment $y_i^s$ on an equal-interval basis, until a sampling point $index_{i'+1}^s - 1$;
    bringing the time difference and the number of sampling points into the following equation:

$$T_{j'}^u + \frac{\Delta T^u}{\Delta N^u - 1} k = T_{j'}^u + \frac{T_{j'+1}^u - T_{j'}^u}{index_{j'+1}^u - index_{j'}^u} k$$

calculating the sampling time of a k-th sampling point after the sampling point $index_j^u$ in the second rock-burst waveform data segment $y_j^u$ on an equal-interval basis, until a sampling point $index_{j'+1}^u - 1$; and
    203) repeating steps 201) and 202) until all sampling points missing a timestamp between each pair of adjacent GPS timestamps in each of the first rock-burst waveform data segment and the second rock-burst waveform data segment are added with a sampling time.

4. The timing alignment method for data acquired by monitoring units of the borehole-surface micro-seismic monitoring system according to claim 3, wherein in step (3), the adding, on an equal-interval basis, a sampling time to a sampling point missing a timestamp except first and last GPS timestamps in each of the first rock-burst waveform data segment and the second rock-burst waveform data segment further comprises:
    301) calculating the average sampling frequency $\bar{f}_s$ of the first rock-burst waveform data segment and the average sampling frequency $\bar{f}_u$ of the second rock-burst waveform data segment:

$$\bar{f}_s = \frac{\sum_{i'=1}^{m-1} \frac{index_{i'+1}^s - index_{i'}^s}{T_{i'+1}^s - T_{i'}^s}}{m-1};$$

$$\bar{f}_u = \frac{\sum_{j'=1}^{n-1} \frac{index_{j'+1}^u - index_{j'}^u}{T_{j'+1}^u - T_{j'}^u}}{n-1};$$

302) adding, according to $$T_1^s - \frac{1}{f_s} * k$$

and on an equal-interval basis, a sampling time to a k-th sampling point before the first GPS timestamp of the first rock-burst waveform data segment monitored by the surface wireless monitoring unit, until a first sampling point of the first rock-burst waveform data segment; and adding, according to $$T_m^s + \frac{1}{f_s} * k$$

and on an equal-interval basis, a sampling time to a k-th sampling point after the last GPS timestamp of the first rock-burst waveform data segment monitored by the surface wireless monitoring unit, until a last sampling point of the first rock-burst waveform data segment; and
adding, according to $$T_1^u - \frac{1}{f_u} * k$$

and on an equal-interval basis, a sampling time to a k-th sampling point before the first GPS timestamp of the second rock-burst waveform data segment monitored by the underground wired monitoring unit, until a first sampling point of the second rock-burst waveform data segment; and adding, according to $$T_n^u + \frac{1}{f_u} * k$$

and on an equal-interval basis, a sampling time to a k-th sampling point after the last GPS timestamp of the second rock-burst waveform data segment monitored by the underground wired monitoring unit, until a last sampling point of the second rock-burst waveform data segment.

5. The timing alignment method for data acquired by monitoring units of the borehole-surface micro-seismic monitoring system according to claim 4, wherein in step (4), the uniform sampling frequency is f; after addition, the sampling time corresponding to the first rock-burst waveform data segment $y_i^s$ is denoted as $\overline{T}_i^s$, and the sampling time corresponding to the second rock-burst waveform data segment $y_j^u$ is denoted as $\overline{T}_j^u$; and the resampling sampling times further comprises:

401) calculating a minimum value $t_{min}^s$ and a maximum value $t_{max}^s$ of the sampling time $\overline{T}_i^s$ and a minimum value $t_{min}^u$ and a maximum value $t_{max}^u$ of the sampling time $\overline{T}_j^u$;

402) determining a start value $$\overline{T}_1^s = = t_{min}^s - \mathrm{mod}\left(t_{min}^s - \frac{1}{f}\right)$$

and an end value $$\overline{T}_{end}^s = t_{max}^s - \mathrm{mod}\left(t_{max}^s, \frac{1}{f}\right)$$

of a sampling time $\overline{T}_i^s$ and a start value $$\overline{T}_1^u = = t_{min}^u - \mathrm{mod}\left(t_{min}^u - \frac{1}{f}\right)$$

and an end value $$\overline{T}_{end}^u = = t_{max}^u - \mathrm{mod}\left(t_{max}^u, \frac{1}{f}\right)$$

or a sampling time $\overline{T}_j^u$ for resampling, wherein mod denotes a modulus operation; and 403) determining the sampling time $\overline{T}_i^s$ for resampling:

$$\overline{T}_i^s = t_{min}^s - \mathrm{mod}\left(t_{min}^s - \frac{1}{f}\right) + (i-1)\frac{1}{f};$$

wherein, i=1, 2, . . . , l, l=$(\overline{T}_{end}^s - \overline{T}_1^s) \times f + 1$; and
determining the sampling time $\overline{T}_j^u$ for resampling:

$$\overline{T}_j^u = t_{min}^u - \mathrm{mod}\left(t_{min}^u - \frac{1}{f}\right) + (j-1)\frac{1}{f};$$

wherein, j=1, 2, . . . p, p=$(\overline{T}_{end}^u - \overline{T}_1^u) \times f + 1$.

6. The timing alignment method for data acquired by monitoring units of the borehole-surface micro-seismic monitoring system according to claim 5, wherein step (5) further comprises calculating a corresponding rock-burst waveform data segment according to the sampling times $\overline{T}_i^s$ and $\overline{T}_j^u$:

501) determining a subscript position index satisfying $\overline{T}_{index}^x < \overline{T}_k^x < \overline{T}_{index+1}^x$;
wherein, k=1, 2, . . . , z; index=1, 2, . . . , z−1; z=l or p; x=u or s; and 502) bringing the subscript position index into the linear interpolation formula:

$$\frac{y_{index+1}^x - y_{index}^x}{\overline{T}_{index+1}^x - \overline{T}_{index}^x} \overline{T}_k^x + y_{index}^x - \frac{y_{index+1}^x - y_{index}^x}{\overline{T}_{index+1}^x - \overline{T}_{index}^x} \overline{T}_{index}^x$$

obtaining a rock-burst waveform data segment $\overline{y}_k^x$.

* * * * *